Nov. 11, 1969   F. G. LAMB ET AL   3,477,242
FLUID BED APPARATUS FOR TREATING FOOD PRODUCTS
Filed June 15, 1967   3 Sheets-Sheet 1

Frank G. Lamb
Arthur R. Davidson
INVENTORS.
BY
BUCKHORN, BLORE, KLARQUIST & SPARKMAN
ATTORNEYS Frank G. Lamb
Arthur R. Davidson
INVENTORS.
BY
BUCKHORN, BLORE, KLARQUIST & SPARKMAN
ATTORNEYS

Nov. 11, 1969      F. G. LAMB ET AL      3,477,242

FLUID BED APPARATUS FOR TREATING FOOD PRODUCTS

Filed June 15, 1967      3 Sheets-Sheet 3

Frank G. Lamb
Arthur R. Davidson
*INVENTOR.*

BY

BUCKHORN, BLORE, KLARQUIST & SPARKMAN
*ATTORNEYS*

United States Patent Office 3,477,242
Patented Nov. 11, 1969

3,477,242
FLUID BED APPARATUS FOR TREATING FOOD PRODUCTS
Frank G. Lamb and Arthur R. Davidson, Lake Oswego, Oreg., assignors to Lamb-Weston, Inc., Portland, Oreg., a corporation of Oregon
Filed June 15, 1967, Ser. No. 646,338
Int. Cl. F25b *5/00;* F26b *3/08;* F25d *25/04*
U.S. Cl. 62—283                                     8 Claims

ABSTRACT OF THE DISCLOSURE

Fluid bed food product treating apparatus such as dryer or freezer having perforated product support member. Air or other gas is blown through plate and flow resisting means is provided immediately beneath plate such that plate and such means effect even distribution of gas through product bed.

BACKGROUND OF THE INVENTION

In the freezing of food products, such as, for example fresh peas, it is desirable to extract the heat from the product as rapidly as possible to obtain a quality product. It is further desirable in freezing such products rapidly to freeze the outer-most skin or layer of the product so that moisture loss from the interior is minimized. For accomplishing these purposes, fluid bed type freezing apparatuses in which subzero air or other gas is blown rapidly through the product are useful in conjunction with freezing of particulate type food products such as peas, corn, beans since efficient contact with the surface of the product being frozen can be maintained and rapid freezing secured.

In any fluid bed type of operation where the product to be treated is positioned upon a perforated support upwardly through which the freezing medium such as air is passed, it has heretofore been deemed important that the supporting member have a resistance to the passage of air therethrough at least as great as that of the product layer so that the member will serve as the distributor for the air and effect relatively even distribution of the air over the entire layer. As apparatus has been constructed heretofore, if the supporting member has a low resistance and the product layer a relatively high resistance to passage of the air therethrough, blow holes in certain portions of the layer are likely to result and through which the majority of the air will pass while the remaining portions of the layer will lie upon the member undisturbed and thus will be subjected to a relatively low flow rate of gas therethrough with the result that even treatment of the product is not secured.

A further difficulty of freezing a food product wherein the unfrozen product is fed onto one end of an elongated support and the frozen product taken off the other end is that more moisture is passed from the product to the freezing medium at the infeed end than at the outfeed with the result that in a re-circulation process uneven frosting of the refrigerating means frequently occurs.

To secure circulation of a freezing medium such as air within a fluid bed type freezer, the air is ordinarily recirculated upwardly through the support and product and thence through expansion coils of a refrigerating device and thence back upwardly through the plate. To secure circulation, fan devices and driving motors are positioned within the freezing compartment and, of course, heat from the motors of the driving fans must also be removed in the refrigerating coils and lessens the over-all efficiency of the freezer.

SUMMARY OF THE INVENTION

An illustrated embodiment of the invention comprises a freezing apparatus including an elongate, insulated chamber having a perforated product supporting plate extending longitudinally of the chamber along one side thereof. Means are provided to feed the wet, unfrozen product onto one end of such plate and further means are provided to remove the frozen product from the opposite end of the plate. Extending longitudinally of the chamber immediately beneath the plate is a refrigerating coil which is directly in contact with the plate and which is designed so as to have an airflow resistance such that the total resistance of the coil and the plate is at least as great as that of the bed or layer of product positioned upon the plate. Thus, the coil itself functions as a distributing device for the air which is to be circulated through the bed and the resistance of the plate can be considerably less than has been required heretofore providing several advantages. One advantage is that the total resistance is less than in arrangements heretofore provided, whereby less energy is needed to circulate the air and less heat from the motors driving the circulating fans is introduced into the circulating air, thus increasing the over-all efficiency of the freezer. Another advantage is that the openings in the plate may be larger removing the likelihood of plugging, a serious problem in prior devices.

Arranged on the side of the freezer compartment opposite that on which the product supporting plate is located are a plurality of frost catching refrigerating coils which are positioned between laterally extending dividing walls so that the frost catching coils are, in effect, arranged in parallel relation to the air circulating from the plate and back downwardly through such frost catching coils. Means are provided to isolate such coils individually from the re-circulating air whereby the frost catching coils may be defrosted one at a time and replaced in operation so that the freezing apparatus may be operated continuously for extended periods of time.

Additionally, means are provided in the apparatus for circulating air longitudinally of the apparatus to effect a more even distribution of the moisture introduced into the chamber with the entering product.

It is accordingly, an object of the present invention to provide a new and improved fluid bed type freezer having improved efficiency.

More particularly, it is the object of the present invention to provide a new and improved fluid bed type freezer having a minimum of resistance to recirculation of the freezing media therein.

Still another object is to provide a fluid bed type freezer capable of prolonged operation without shutdown for defrosting of the refrigerating coils.

Another object of the invention is to provide a fluid bed type freezer wherein the freezing medium will be propelled through the warm, wet product at a faster velocity than through the product on the remainder of the bed so as to effect rapid formation of a surface glaze upon the product. Other objects and advantages of the invention will become more apparent hereinafter.

DRAWINGS

FIG. 1 is a fragmentary perspective view of a freezing apparatus constructed in accordance with the invention, parts being broken away to show certain details;

DETAILED DESCRIPTION

Figure 5:
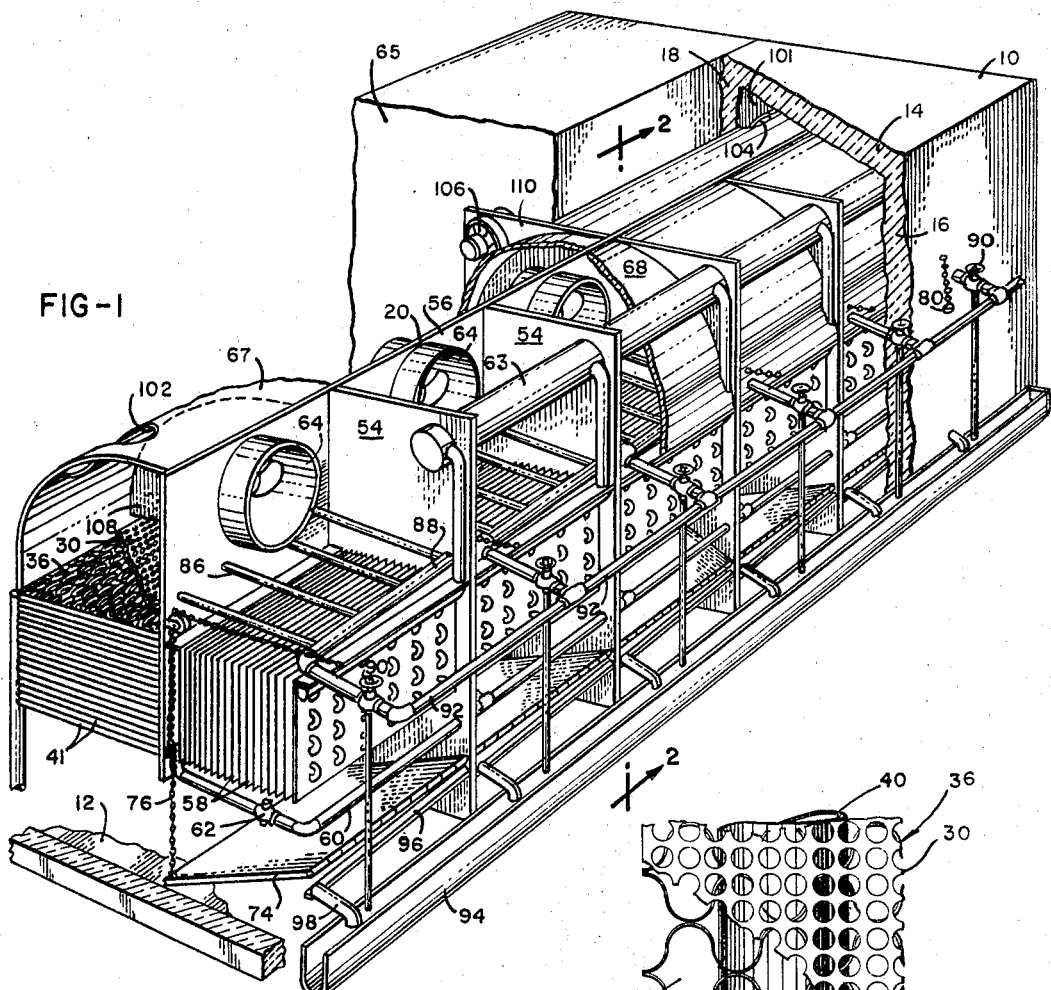
FIG. 5 is a fragmentary sectional view of a modified arrangement of freezer coil and product supporting plate.
Figure 4:
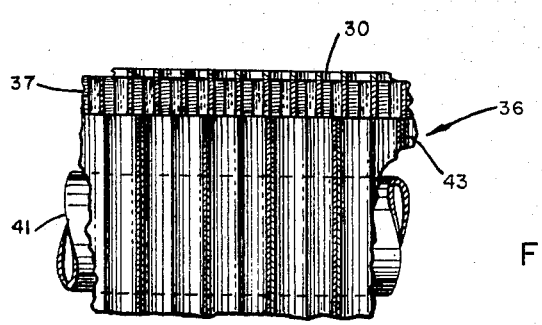
FIG. 4 is an enlarged, fragmentary top plan view of the product supporting plate and coil.
Figure 2:
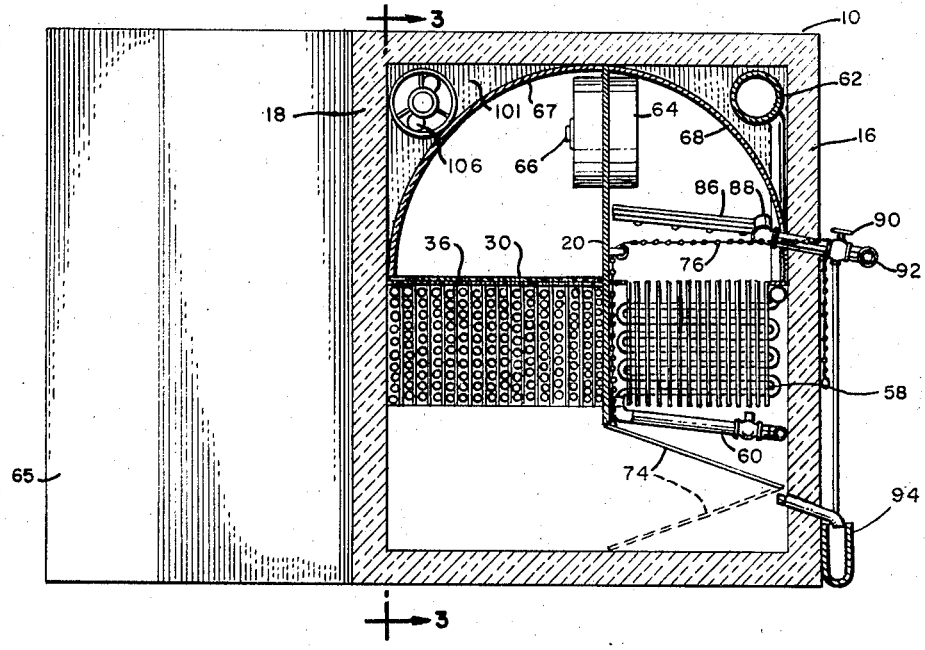
FIG. 2 is a cross-sectional view taken substantially along line 2—2 of FIG. 1.
Figure 3:
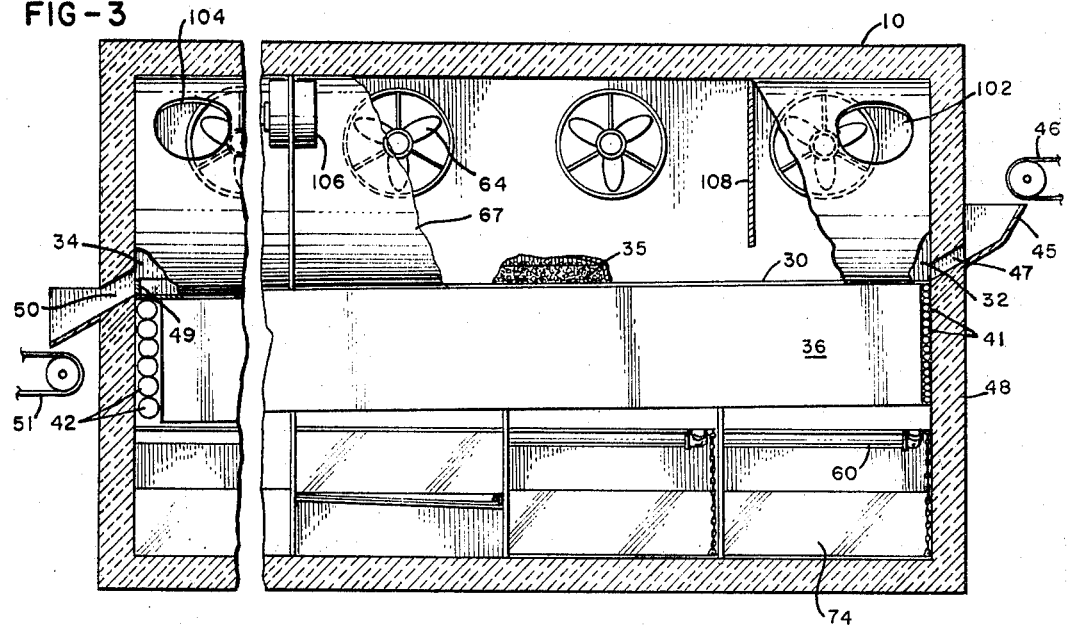
FIG. 3 is a sectional view taken substantially along line 3—3 of FIG. 2.

Referring first to FIGS. 1 to 4 the illustrated apparatus includes an elongated, insulated chamber 10 defined by an insulated bottom wall 12, a top wall 14, opposite side walls 16, 18.

Extending longitudinally of the chamber is a center wall 20 which extends to the top wall 14, the bottom edge of the center wall being spaced above the bottom wall 12.

Extending longitudinally of the chamber between the center wall 20 and the side wall 18 is an elongate, perforated product supporting member or plate 30 which preferably slopes slightly downwardly from an entrance end 32 to a discharge end 34 and supports product in a layer 35. An inclination of about 1 inch in 20 feet is sufficient for processing products such as peas. Positioned beneath the plate 30 and extending longitudinally of the chamber is a heat exchanger in the form of a refrigerating expansion coil 36 which is constructed in such a manner as to have vertically extending channels for air to circulate therethrough with substantially no lateral or longitudinal circulation of air within the coil. In accordance with the invention, the plate 30 is positioned sufficiently close to the coil as to permit no substantial flow of gaseous medium laterally or longitudinally of the plate. The plate 30 may, as shown, be positioned directly upon the coil 36 so that air emerging from the coil 36 is passed directly upwardly through the openings in the plate 30 and no lateral circulation of air may take place between the plate 30 and the coil 36. In some cases it will be preferred that the plate 30 not rest directly on the coil 36 but be positioned some distance above, as shown in FIG. 5, and the intervening space occupied by a honey-comb grill 37 that permits the air to pass from the coil to bed without lateral movement. The grill 37 may be of fibreboard or other nonheat conducting material thus to insulate the plate 30 from direct contact with the coil 36 and to minimize the chance of frost collection upon the plate.

As will be apparent, the actual physical configuration of the coil 36 can take many forms. The illustrated coil is shown as comprising a plurality of longitudinally extending expansion tubes 40 to which refrigerant is introduced from a refrigerant condensing or cooling system through headers 41 positioned adjacent the entrance end of the coil, the expanded and/or warmed refrigerant being withdrawn through suction headers 42 (FIG. 3) positioned at the discharge end of the coil. Secured to the tubes 40 are heat absorbing fins 43, see FIG. 4, arranged in a honeycomb-like structure to define vertical channels 44 through the coil, the entire arrangement as indicated previously, being such that the resistance of the flow of air through the coil 36 and the plate 30 at the design velocity of the freezer is at least as great as and preferably two or three times the resistance to air flow of the layer of product to be processed in the apparatus. As shown in the drawings, the coil 36 is positioned above the bottom of the center wall 20 so that air may flow freely from the opposite side of the chamber into the plenum area defined by walls of the chamber beneath the coil 36.

Suitable means are provided to feed product into the freezer and which means may comprise a hopper 45 fed by a conveyor 46 or other suitable means and from which hopper product is permitted to flow onto the bed through a weir-like opening 47 in the end wall 48 of the freezer.

At the opposite end of the freezing chamber a movable weir 49 is positioned and which by suitable means (not shown) may be raised and lowered and over which the frozen product may spill onto a trough 50 and conveyor 51 or suitable receptacle.

Extending laterally from top to bottom of the chamber and to the side wall 16 are a plurality of lateral walls 54 which divide the right portion of the chamber, as it is viewed in FIG. 1, into a plurality of compartments 56, there being six compartments in the illustrated embodiment. Mounted one in each of the compartments 56 immediately above the bottom edge of the center wall 20 are a plurality of individual refrigerated cooling coils 58. Preferably, the cooling coils 58 have a minimum of resistance to airflow consistent with adequate heat exchange. The coils 58 are dehumidifying coils adapted to be operated at a subfreezing temperature so as to extract from the air passing through them a substantial amount of the moisture present in such air thus minimizing the amount of moisture which will condense on the coil 36.

In the illustrated embodiment of the invention, the coils 58 are connected to a refrigerant distributing header 60 extending longitudinally of the chamber, suitable remotely controlled valves 62 being provided to connect the coils to the header 60 so that the individual coils may be shut off as desired. The expanded or warmed refrigerant is removed from the coils 56 through a suction header 63. Instead of connecting the expansion coils 58 as a bank to suitable refrigerating means, it may be desirable to provide individual refrigeration units for each cooling coil and to operate each as an individual unit. While the refrigerant condensing or cooling units may be provided at any convenient location they may conveniently be positioned on either side of the chamber 10, as for example, in a bank 65.

Means are provided to effect lateral circulation of air in the chamber. Such means comprise a plurality of fans 64 mounted in the center wall 20 and driven by motors 66 so as to force air from the space above the plate 30 into the compartments 56 from which the air moves downwardly through the coil 58 in each compartment, beneath the wall 20 and into the plenum area beneath the coil 36 and thence upwardly through the coil 36, plate 30 and the product thereon. To effect more efficient lateral circulation of air a curved deflecting wall 67 is preferably provided between the top of the wall 20 and the outer edge of the plate 30 and a similarity curved deflecting wall 68 is preferably provided in each of the compartments 56 between the top edge of the wall 20 and the top corner of the refrigerating coil therein.

The change in direction of the air as it moves downwardly from the coils 58 and through the plenum area beneath the coil 36 enables food particles and ice crystals to drop out thus preventing or minimizing plugging of the coil 36 and plate 30.

Means are provided to isolate selected ones of the coils 58 from the path of the laterally circulating air so that such coils may be defrosted. In the illustrated embodiment such means comprise plates 74 hingedly mounted on the chamber sidewall 16 medially between the bottom 12 of the chamber and the bottom of the expansion coil 58 in the corresponding compartment 56. The plates 74 extend from side to side of the corresponding compartment and are swingable from a first position wherein the lower edge of the plate engages the bottom wall 12 of the compartment, as shown in dotted lines in FIG. 2, and a second position wherein such plate engages the lower edge of the center wall 20, as shown in solid lines in FIG. 3. As will be apparent, in the latter position the plate 74 will arrest circulation of air through the corresponding compartment whereas in the former position air may flow through the compartment into the plenum space beneath the coil 36. Suitable means are provided for effecting raising and lowering of the plates 74, such means in the illustrated embodiment comprising chain 76 connected to the free edges of the plates 74 and extending upwardly over pulleys 78 and thence outwardly through the wall 16 to suitable catches 80. Suitable remote controlled means could be provided for raising and lowering plates 74.

Means are provided to assist the defrosting of the coils 58. Mounted in each of the compartments are defrost laterals 86 connected to header 88. The headers 88 are connected through suitable valves 90 to a warm or hot water line 92. Preferably, the valves 90 are self-draining type valves so that upon closure of the valves 90 to flow of water from the line 92, the valves will drain the laterals 86 and headers 88 into a drain trough 94. Arranged on the inner wall of the chamber 16 in each compartment immediately beneath the hinge connection of the plates 74 are drain channels 96. The water from the headers 86 flowing through the coils 58 will fall upon the upwardly raised plate 74 and drain to the channels 96 and thence outwardly through drain spouts 98 into the drain trough 94. The defrost laterals 86 and headers 94 may be provided with self-contained heating wires so that if they are not completely drained upon closure of the valve 90 any ice therein may be melted when it is desired to defrost the coil 58.

As will be apparent, considerably more moisture will evaporate from the relatively warm product as it is introduced at the entrance end 32 of the freezer than after the surface of such product is glazed and the moisture in the product is frozen. To minimize excessive frosting of the coils at the entrance end of the freezer, means are provided in the instant freezer to induce longitudinal circulation of the air so that distribution of the moisture is spread out more evenly over the length of the freezing coil 36, and over the defrost coils 58 thus prolonging periods of operation between shutdowns necessary to defrost such coils. In the instant arrangement, the space between the deflecting wall 67 and the upper wall 10 and side wall 18 is utilized as a duct 101 which communicates with the plenum area over the plate 30 through openings 102, 104 in the wall 67 adjacent the opposite ends thereof. Circulation through the duct 101 is provided by means of a motor driven fan 106 mounted in a dividing wall 110. Preferably, the fan 106 induces circulation through the duct 101 from the inlet end of the freezing chamber to the outlet end thereof. As a result of the withdrawal of the moisture laden air from the inlet end of the device and its re-introduction into the drier outlet end, longitudinal circulation of the air within the freezing tunnel is induced so that a more even distribution of the moisture condensing on the coils will occur. The withdrawal of air from the entrance end to secure longitudinal circulation may be utilized to effect an increase in the air velocity through the product at the entrance or wet end of the device to thereby effect an increase in the freezing rate and effect rapid formation of a glaze upon the surface of the product pieces. Preferably, a baffle 108 is provided across the freezing tunnel above the bed 30 adjacent the inlet end so as to restrict air flow from the remainder of the tunnel above the bed to the circulating fan 106. Since the space above the plate 30 and coil 36 between the baffle 108 and end wall 48 will be subject to the suction of both the fan 106 and lateral circulating fan 64 communicating with such space, air will be forced upwardly through the coil and plate area beneath such space at an increased velocity with respect to the velocity over the remainder of the coil and plate.

In operation, as the product is fed into the freezing tunnel it will be quickly glazed and surface hardened and the product will be kept in continual motion by the upward flow of air through the plate 30 so that the product will flow substantially like a liquid toward the opposite end of the freezing tunnel. The period of time that the product remains in the tunnel can be regulated by the height of the weir 49 and by the rate at which the product is fed to the tunnel. When it is desired completely to empty the freezing tunnel the weir 49 is lowered to the level of the plate 30 and the product will almost competely be discharged through the discharge trough 50.

Periodically, of course, the coil 36 will become so frosted that its efficiency will be impaired at which time the freezing tunnel will be emptied of product and the refrigerant turned off. Defrost water can then be simply permitted to flow onto the plate 30 which will act like a distributing member to distribute the water through the coil channels 47 to melt the frost from the same. The bottom wall 12 of the tunnel is formed as a channel or tray to catch the defrost water and conduct it outwardly of the freezing chamber through suitable means (not shown).

The parallel arrangement of the defrost coils 58 is for the purpose of permitting stopping of air circulation through one of the coils while it is defrosted while the remaining coils remain in operation. Thus in a two hour cycle, for a six unit freezer each coil 58 may be removed from operation for a period of twenty minutes for defrosting while lateral circulation of air is continued through the reaining coils.

As an example of the pressure drop characteristics of a freezer made in accordance with the invention as compared with a fluid bed freezer of the prior art, in the case of the latter a freezer for freezing peas is provided with a plate that will have a pressure drop of about 3 inches of water when a layer of peas about six inches in thickness is to be processed and which layer will itself have a pressure drop of about one inch of water. In such an instance the refrigerating coil through which the air is passed prior to its flow through the plate will have a pressure drop as low as possible and of the order of 1½ inches of water. On the other hand, in a freezer made in accordance with the invention for processing peas in a layer of approximately six inch thickness, the plate 36 may have a pressure drop of about 1½ inches of water, and the coil may have a pressure drop of about 1½ inches of water so that the total pressure drop over the coil and the plate is equal to that of the plate alone in the previous case. Thus the one inch pressure drop formerly imposed by the coil itself is eliminated and the energy that is required to secure circulation of air through the tunnel is lessened appreciably. The overall efficiency of the freezer is thus increased.

Figure 6:
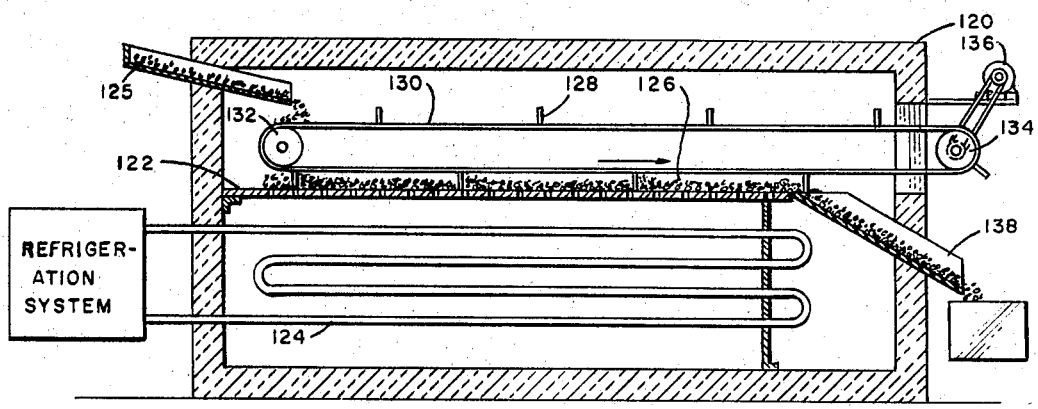
FIG. 6 is a diagrammatic illustration of a modified freezer combination.

In handling of some products it is desirable to provide means to cause positive movement of the product to the discharge end and also to provide some barrier to straight through movement of a product. Positive movement is desired to prevent product remaining in the freezer for an excessively long period. More importantly clumps of products sometimes form and which continue to enlarge to the point of blocking entirely the flow of product through the freezer. At other times rapidly moving channels of product form, and product in such channels is not retained within the freezer for a sufficiently long period. Accordingly, in accordance with another aspect of the invention means are provided to maintain positive movement of the product. Referring to FIG. 6, illustrated is a freezer 120 having a stationary pervious product supporting plate 122 therein. A refrigerating coil 124 similar to the coil 36 is mounted beneath the plate 122 in contact therewith. Means comprising a chute 125 is provided to feed the product to be frozen upon the plate 122 at a rate that such product forms a bed 126 of predetermined depth. Suitable means (not shown) such as those described hereinbefore are provided for causing recycling of air through the coil 124 and bed 126. The coil 124 and plate 122 are designed so as to have a resistance to airflow at least equal to and preferably twice as great as the resistance of the bed 126. Mounted over the plate 122 is a product propelling mechanism comprising a plurality of paddles or flights 128 carried by cables or chains 130 supported upon suitable pulleys 132, 134. The flights 128 extend the width of the plate 122 and have a height at least as great as the depth of the bed 126. A motor 136 is connected to drive the flights so that they will propel product at the desired rate from the infeed end of the freezer to the discharge end of the plate 122 from which they may be carried out of the freezer by suitable means such as a chute 138. The pulleys 134 are preferably located outside of the tunnel so that the paddles may be continually deiced by conventional means.

Figure 7:
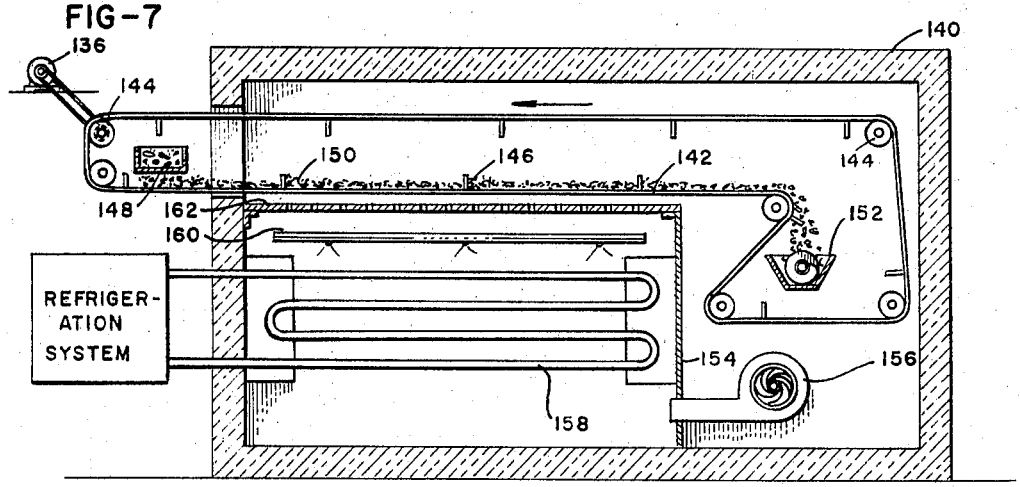
FIG. 7 is a diagrammatic illustration of still another freezer combination.

In some instances it may be desirable to carry the product through the freezer upon a moving belt. Conventionally these are formed of wire mesh and have such a low resistance to airflow therethrough that proper air distribution through the belt and product bed cannot be maintained. In accordance with the invention resisting means is provided in conjunction with the belt so that proper distribution of the freezing air may be maintained. Referring to FIG. 7, in this embodiment a freezer 140 is provided with a conveyor comprising a wire mesh or like pervious belt 142 trained over suitable pulleys 144. The belt preferably is provided with flights 146 of height at least as great as great as the depth of the product bed to be carried up the belt. Means such as chute 148 are provided to feed product onto the belt 142 to form a bed 150 and suitable means such as a screw conveyor 152 are provided to collect the frozen product. To force refrigerated air through the belt 142 and bed 150 a plenum chamber 154 is provided beneath the belt into which air is delivered by a fan 156. A refrigeration coil 158 is interposed in the path of air flow to refrigerate the same. The coil 158 may be positioned directly in contact with or sufficiently close to the belt 142 as to prevent any substantial flow of air laterally between the coil and belt. If so positioned the coil is so designed that the flow resistance through it and the belt 142 will be at least as great, and preferably twice as great, as that of the product bed. In other instances it may be desirable to position the coil 158 a sufficient distance beneath the belt 142 as to permit the installation of sprayers 160 for carrying defrosting fluid. In such instance a flow resisting means such as a perforated plate 162 may be provided beneath the belt 142 either in contact therewith or in such close proximity as to preclude substantial lateral flow of air between the plate and bed. Again the plate is provided with openings of such size that the flow resistance thereof when added to that of the belt 142 is at least as great as that of the product bed 150. In either arrangement just described the result will be to maintain substantial uniform air flow through the entire bed.

It will be apparent that the principles of the invention will also have usefulness in fluid bed type drying tunnels where steam coils instead of freezing coils or other flow resisting means will be positioned beneath the product supporting member and provide the distributing resistance to secure even distribution of the drying air through the product.

Having illustrated and described a preferred embodiment of the invention, it should be apparent to those skilled in the art that the invention permits of modification in arrangement and detail. We claim all such modifications as come within the scope and the spirit of the appended claims.

We claim:

1. In fluid bed type apparatus for treating with a gaseous medium a particulate food product in a bed having a predetermined resistance to flow of said gaseous medium therethrough, the combination comprising;
    a pervious member for supporting said product bed, a plenum beneath said member,
    means for supplying said gaseous medium to said plenum in a volume rate sufficient to maintain said product bed in a fluidized condition,
    flow resisting means positioned beneath said member comprising an expansion coil of a refrigeration system in contact therewith,
    said gaseous medium being introduced to said plenum beneath said flow resisting means,
    said flow resisting means and said member having a combined resistance to flow of said gaseous medium therethrough at least as great as said predetermined bed resistance whereby the flow of said gaseous medium will be maintained substantially uniformly through said product bed,
    and means for feeding food products to one end of said pervious member in a layer of predetermined thickness such as to form a bed of food products that has said predetermined resistance to flow of gaseous medium therethrough.

2. Apparatus as set forth in claim 1 wherein a honeycomb structure of a non-heat conducting material is interposed between said coil and said member in contact with each and defining a plurality of channels perpendicular to said member and of narrow width.

3. Apparatus as set forth in claim 1 wherein said member is a stationary perforated platm.

4. Apparatus as set forth in claim 1 wherein said member is a pervious, longitudinally movable conveyor member.

5. Apparatus as set forth in claim 1 wherein said combined resistance is at least twice said predetermined resistance.

6. Apparatus as set forth in claim 1 including means to effect recycling of said gaseous medium as it emerges from said product bed back to said plenum,
    and a refrigeration coil in the path of said recycling gaseous medium between said product bed and said plenum adapted to be operated at a temperature below 30° F. so as to effect condensation of moisture in said gaseous medium upon said refrigeration coil.

7. Apparatus as set forth in claim 1 including means to effect recycling of said gaseous medium as it emerges from said product bed back to said plenum,
    a pair of refrigeration coils in the path of said recycling gaseous medium between said product bed and said plenum adapted to be operated at a temperature below 32° F. so as to effect condensation of moisture in said gaseous medium upon said coils,
    means associated with said refrigeration coils defining parallel paths for said recycling gaseous medium through each of said coils,
    and means operatively arranged with said path defining means for selectively preventing flow of said gaseous medium through a selected one of said paths to enable defrosting of the said refrigeration coil associated therewith.

8. Apparatus as set forth in claim 2 for freezing a food product,
    and means for effecting positive movement of products from said one end to said opposite end of said plate.

References Cited

UNITED STATES PATENTS

| | | | |
|---|---|---|---|
| 2,365,769 | 12/1944 | Marshall | 34—10 X |
| 2,513,369 | 7/1950 | Shaw | 34—57 X |
| 2,223,972 | 12/1940 | Sterling | 62—57 |
| 3,115,756 | 12/1963 | Overbye | 62—57 |
| 3,166,383 | 1/1965 | Morris | 34—10 |
| 3,169,381 | 2/1965 | Persson | 62—57 |
| 3,293,768 | 12/1966 | Blank et al. | 34—10 |
| 3,258,102 | 6/1966 | Wakatsuki | 62—380 X |

WILLIAM E. WAYNER, Primary Examiner

U.S. Cl. X.R.

34—10; 62—57; 165—104

PO-1050
(5/69)

UNITED STATES PATENT OFFICE
CERTIFICATE OF CORRECTION

Patent No. 3,477,242      Dated    November 11, 1969

Inventor(s) Frank G. Lamb and Arthur R. Davidson

It is certified that error appears in the above-identified patent and that said Letters Patent are hereby corrected as shown below:

Column 6, line 13, "reaining" should be -- remaining --

Column 8, line 17, "platm" should be -- plate --; line 30 "30°" should be -- 32° --

SIGNED AND
SEALED
FEB 17 1970

(SEAL)
Attest:

Edward M. Fletcher, Jr.
Attesting Officer

WILLIAM E. SCHUYLER, J
Commissioner of Patent